United States Patent
Shoji

(10) Patent No.: US 10,210,139 B2
(45) Date of Patent: Feb. 19, 2019

(54) INFORMATION PROCESSING DEVICE AND INFORMATION PROCESSING METHOD

(71) Applicant: SONY CORPORATION, Tokyo (JP)

(72) Inventor: Yuki Shoji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 14/900,054

(22) PCT Filed: May 14, 2014

(86) PCT No.: PCT/JP2014/062775
§ 371 (c)(1),
(2) Date: Dec. 18, 2015

(87) PCT Pub. No.: WO2015/004984
PCT Pub. Date: Jan. 15, 2015

(65) Prior Publication Data
US 2016/0147714 A1  May 26, 2016

(30) Foreign Application Priority Data
Jul. 10, 2013 (JP) ................. 2013-144896

(51) Int. Cl.
*G06F 17/00* (2006.01)
*G06F 17/21* (2006.01)
*G06F 3/0482* (2013.01)

(52) U.S. Cl.
CPC .......... *G06F 17/212* (2013.01); *G06F 3/0482* (2013.01); *G06F 2203/04803* (2013.01)

(58) Field of Classification Search
CPC .... G06F 3/0482; G06F 17/212; G06F 3/0485; G06F 17/211
See application file for complete search history.

(56) References Cited

U.S. PATENT DOCUMENTS

| D687,846 S | * | 8/2013 | Jou | D14/486 |
| D719,580 S | * | 12/2014 | Wang | D14/486 |
| 2005/0055635 A1 | * | 3/2005 | Bargeron | G06F 17/211 715/251 |

(Continued)

FOREIGN PATENT DOCUMENTS

| JP | 2006-221601 A | 8/2006 |
| JP | 2009-065462 A | 3/2009 |

(Continued)

OTHER PUBLICATIONS

Extended European Search Report of EP Patent Application No. 14822940.4, dated Feb. 1, 2017, 9 pages.

*Primary Examiner* — Scott T Baderman
*Assistant Examiner* — Barbara M Level
(74) *Attorney, Agent, or Firm* — Chip Law Group

(57) ABSTRACT

An information processing device includes an acquisition unit that acquires a plurality of content information pieces; and a generation unit that generates a page in which the plurality of content information pieces are disposed in accordance with templates regarding configurations of information elements. Further, the generation unit generates the page in a manner that the plurality of content information pieces are lined up in one direction and the plurality of content information pieces lined up in the one direction are separated from each other by one or more diagonal lines to the one direction.

20 Claims, 19 Drawing Sheets

(56) References Cited

U.S. PATENT DOCUMENTS

| | | | |
|---|---|---|---|
| 2005/0223319 A1* | 10/2005 | Ohashi | G06T 11/206 715/248 |
| 2010/0011315 A1* | 1/2010 | Araki | G06F 3/0482 715/783 |
| 2012/0013640 A1 | 1/2012 | Chen | |
| 2012/0089914 A1* | 4/2012 | Holt | G06F 3/0485 715/728 |
| 2013/0151987 A1 | 6/2013 | Flynn, III et al. | |
| 2013/0174023 A1 | 7/2013 | Marantz et al. | |
| 2014/0325437 A1* | 10/2014 | Pacenta | G06F 3/04883 715/793 |

FOREIGN PATENT DOCUMENTS

| | | |
|---|---|---|
| JP | 2010-050528 A | 3/2010 |
| JP | 2013-126150 A | 6/2013 |

\* cited by examiner

INFORMATION PROCESSING DEVICE AND INFORMATION PROCESSING METHOD

TECHNICAL FIELD

The present disclosure relates to an information processing device, an information processing method, and a program.

BACKGROUND ART

Recently, information processing devices such as smartphones and tablet terminals have been widespread. The information processing devices such as smartphones and tablet terminals display various content information. In particular, in a case in which a plurality of content information pieces are displayed, the plurality of content information pieces are often lined up in one direction in a list.

For example, Patent Literature 1 describes a technology of displaying bookmark information lined up in one direction (direction from top to bottom of a screen), the bookmark information including a thumbnail image of content and descriptions of the content.

CITATION LIST

Patent Literature

Patent Literature 1: JP 2013-126150A

SUMMARY OF INVENTION

Technical Problem

However, according to the related art including the technology disclosed in Patent Literature 1, sometimes it may be difficult for a user to recognize a boundary between the plurality of content information pieces lined up in one direction (for example, a vertical direction of the screen). For example, in a case in which the plurality of content information pieces are lined up in the one direction (for example, the vertical direction of the screen), the plurality of content information pieces are not separated from each other or are separated by lines vertical to the one direction (for example, lines in a horizontal direction). In this case, the user may feel the list of the content information pieces as monotonous. Accordingly, for example, in a case in which an area of a certain content information piece is long, it may be difficult for the user to recognize that a subsequent content information piece is content information piece different from the certain content information piece. Alternatively, for example, it may be difficult for the user to recognize the boundary between the plurality of content information pieces in a case in which the screen of the smartphone, tablet terminal, or the like is scrolled quickly and the user browses the plurality of content information pieces or searches for a content information piece. As a result, decrease in user convenience is concerned.

Accordingly, it is desirable to provide a system capable of easily recognizing a boundary between a plurality of content information pieces.

Solution to Problem

According to the present disclosure, there is provided an information processing device including: an acquisition unit that acquires a plurality of content information pieces; and a generation unit that generates a page in which the plurality of content information pieces are disposed in accordance with templates regarding configurations of information elements. The generation unit generates the page in a manner that the plurality of content information pieces are lined up in one direction and the plurality of content information pieces lined up in the one direction are separated from each other by one or more diagonal lines to the one direction.

According to the present disclosure, there is provided an information processing method executed by an information processing device, the information processing method including: acquisition of a plurality of content information pieces; and generation of a page in which the plurality of content information pieces are disposed in accordance with templates regarding configurations of information elements. The generation of the page includes generation of the page in a manner that the plurality of content information pieces are lined up in one direction and the plurality of content information pieces lined up in the one direction are separated from each other by one or more diagonal lines to the one direction.

According to the present disclosure, there is provided a program causing a computer to function as: an acquisition unit that acquires a plurality of content information pieces; and a generation unit that generates a page in which the plurality of content information pieces are disposed in accordance with templates regarding configurations of information elements. The generation unit generates the page in a manner that the plurality of content information pieces are lined up in one direction and the plurality of content information pieces lined up in the one direction are separated from each other by one or more diagonal lines to the one direction.

Advantageous Effects of Invention

According to the present disclosure as described above, it is possible to easily recognize a boundary between a plurality of content information pieces. Note that the present disclosure is not limited to the effect stated above and in addition to or in place of the effect stated above, may achieve any of the effects indicated in this specification.

DESCRIPTION OF EMBODIMENT(S)

Figure 1:
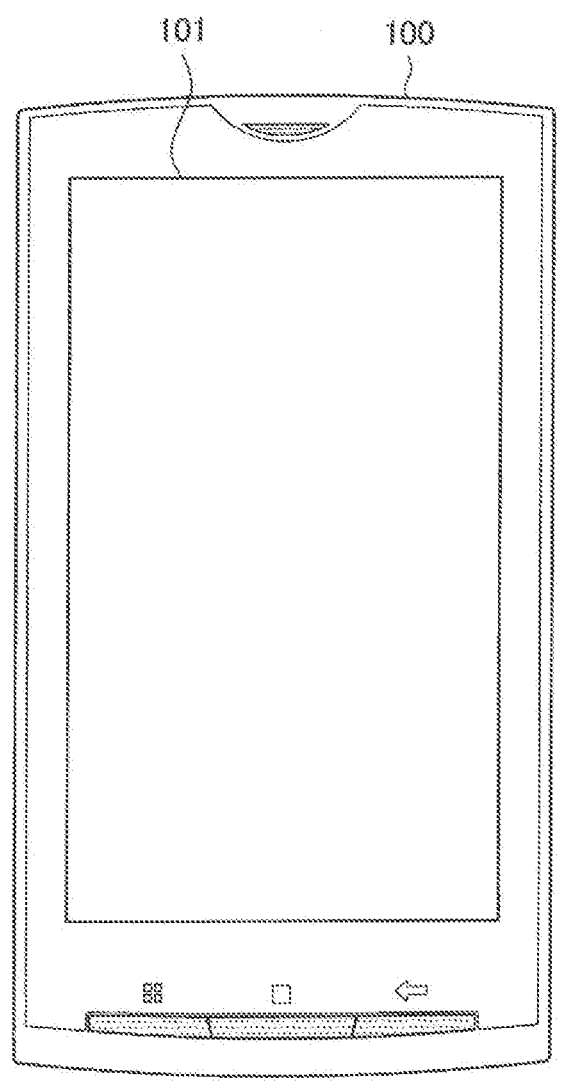
FIG. 1 is an explanatory diagram illustrating an example of appearance of an information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this specification and the drawings, structural elements that have substantially the same function and structure are sometimes distinguished from each other using different alphabets after the same reference numerals. For example, structural elements that have substantially the same function and structure are distinguished into a content information piece 20A, a content information piece 20B, and a content information piece 20C, as needed. However, when there is no need in particular to distinguish structural elements that have substantially the same function and structure, the same reference numeral alone is attached. For example, when there is no need in particular to distinguish the content information piece 20A, the content information piece 20B, and the content information piece 20C from each other, they are simply referred to as content information pieces 20.

Note that the description is given in the following order.
1. Appearance of Information Processing Device
2. Configuration of Information Processing Device
2.1. Hardware Configuration
3.2. Functional Configuration
3. Specific Example of Page according to Present Embodiment
4. Flow of Processing
5. Alteration
6. Conclusion <<1. Appearance of Information Processing Device>>

First, with reference to FIG. 1, appearance of an information processing device according to an embodiment of the present disclosure is described. FIG. 1 is an explanatory diagram illustrating an example of appearance of an information processing device according to an embodiment of the present disclosure. FIG. 1 shows an information processing device 100. In this example, the information processing device 100 is a terminal device, and for example, is a smartphone.

For example, the information processing device 100 includes a display device 101. On the display device 101, the information processing device 100 displays a screen for a user of the information processing device 100 to see.

For example, the information processing device 100 includes a touchscreen. In this case, the display device 101 is a display screen of the touchscreen. The information processing device 100 detects user's touch on the touchscreen, and recognizes a user's touch operation from a result of the detection.

<<2. Configuration of Information Processing Device>>

Next, with reference to FIGS. 2 to 7, an example of a configuration of the information processing device 100 according to the present embodiment is described.

<2.1. Hardware Configuration>

Figure 2:
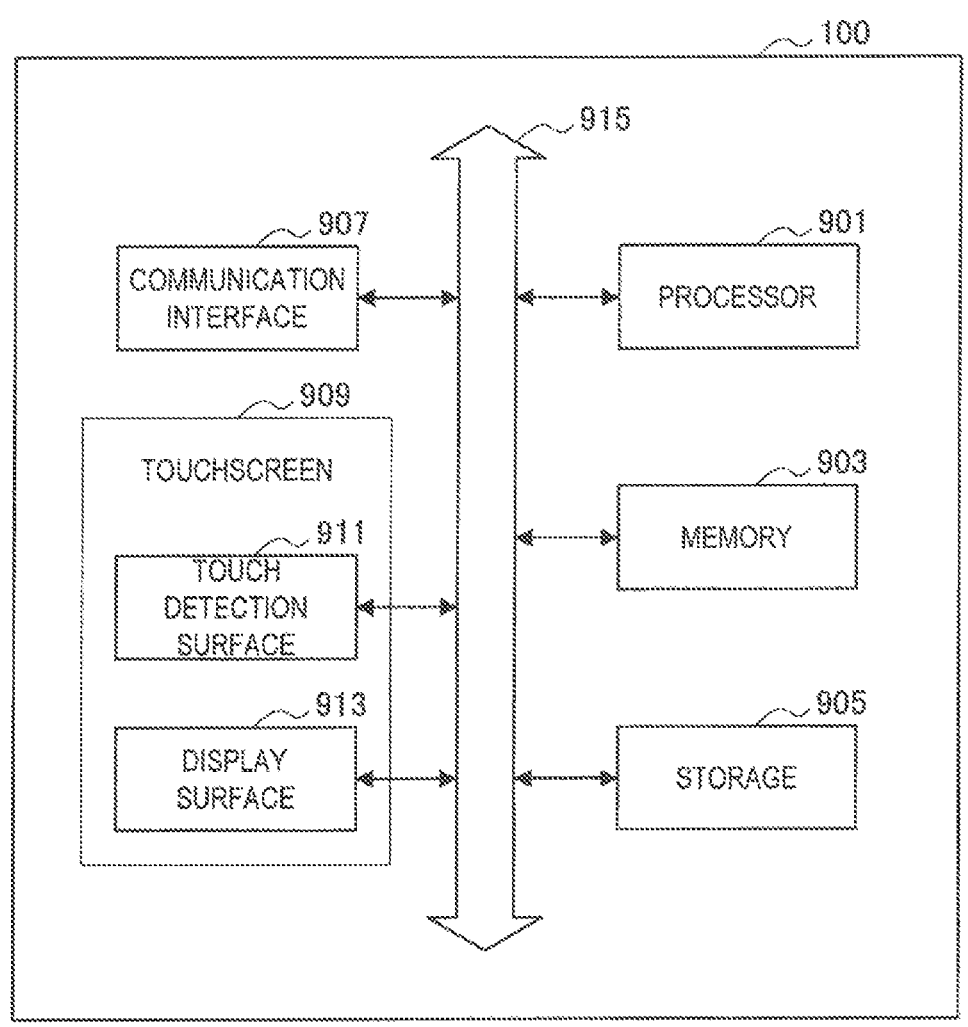
FIG. 2 is a block diagram showing an example of a hardware configuration of an information processing device according to an embodiment.

With reference to FIG. 2, an example of a hardware configuration of the information processing device according to the present embodiment is described. FIG. 2 is a block diagram showing an example of a hardware configuration of the information processing device 100 according to the present embodiment. With reference to FIG. 2, the information processing device 100 includes a processor 901, memory 903, a storage 905, a communication interface 907, a touchscreen 909, and a bus 915.

For example, the processor 901 may be a central processing unit (CPU), a digital signal processor (DSP), or a system on chip (SoC), and executes various processing of the information processing device 900. The memory 903 includes random access memory (RAM) and read only memory (ROM), and stores data and programs executed by the processor 901. The storage 905 may include a storage medium such as semiconductor memory or a hard disk.

The communication interface 907 is a communication means included in the information processing device 100, and communicates with an external device directly or via a network. The communication interface 907 may be a wireless communication interface. In this case, the communication interface 907 may include a communication antenna, radio frequency (RF) circuit, a baseband processor, and the like, for example. Alternatively, the communication interface 907 may be a wired communication interface. In this case, the communication interface 907 may include a connection terminal, a transmission circuit, and another circuit for communication processing, for example.

The touchscreen 909 includes a touch detection surface 911 and a display surface 913. The touch detection surface 911 detects a touch position on the touchscreen 909. The touch detection surface 911 can be formed in accordance with any touch detection system, such as an electrostatic capacity system, a resistive membrane system, or an optical system. The display surface 913 displays an output image from the information processing device 100. The display surface 913, for example, can be realized by using liquid crystals, organic ELs (organic light-emitting diodes: OLEDs), a cathode ray tube (CRT), or the like.

The bus 915 mutually connects the processor 901, the memory 903, the storage 905, the communication interface 907, and the touchscreen 909. The bus 915 may include a plurality of kinds of buses.

Note that, the display device 101 is the touchscreen 909, for example.

<2.2. Functional Configuration>

Figure 3:
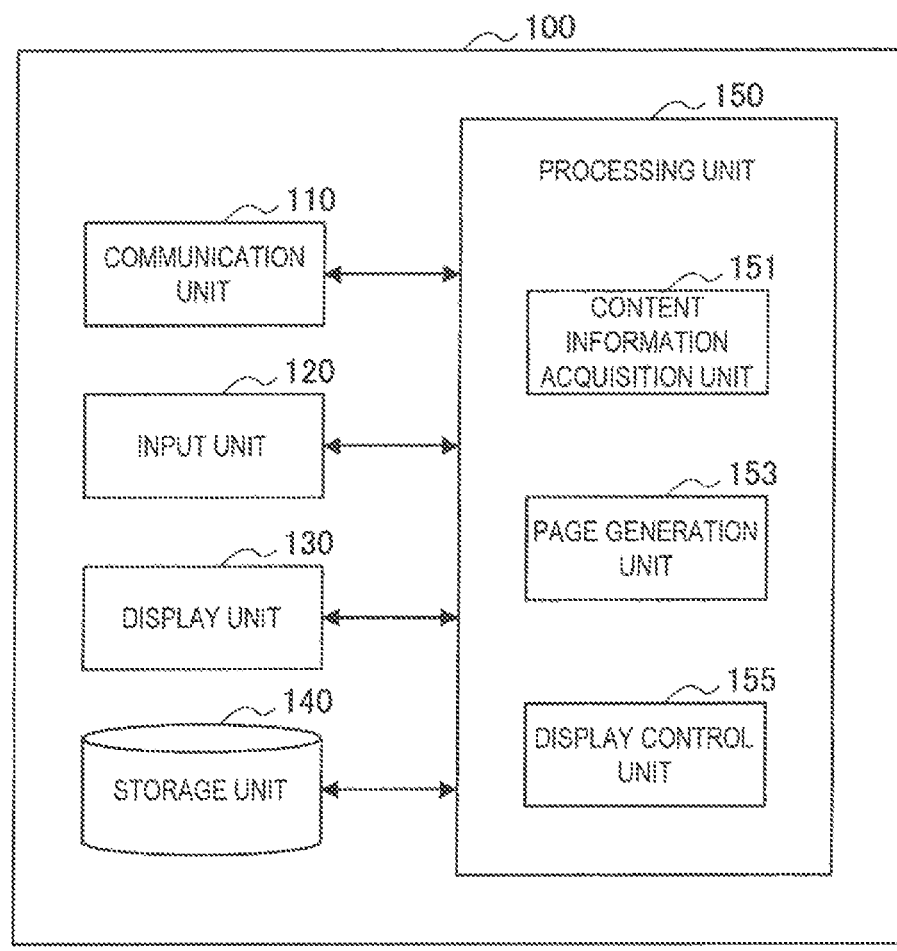
FIG. 3 is a block diagram showing an example of a functional configuration of an information processing device according to an embodiment.

Next, with reference to FIGS. 3 to 7, an example of a functional configuration of the information processing device 100 according to the present embodiment is described. FIG. 3 is a block diagram showing an example of the functional configuration of the information processing device 100 according to the present embodiment. With reference to FIG. 3, the information processing device 100 includes a communication unit 110, an input unit 120, a display unit 130, a storage unit 140, and a processing unit 150.

(Communication Unit 110)

The communication unit 110 communicates with another device. For example, the communication unit 100 receives information from another device, and provides the information to the processing unit 150. In addition, the communication unit 110 transmits information from the processing unit 150 to another device.

(Input Unit 120)

The input unit 150 receives an input from a user of the information processing device 100. Subsequently, the input unit 120 provides an input result to the processing unit 150.

(Display Unit 130)

The display unit 130 displays a screen for the user of the information processing device 100 to see. Accordingly, the display device 101 corresponds to the display device 101. For example, the display unit 130 displays the screen in response to a control from the processing unit 150 (display control unit 155).

(Storage Unit 140)

The storage unit 140 stores a program and data for the information processing device 100 to be operated. For example, the storage unit 140 stores content information pieces.

(Processing Unit 150)

The processing unit 150 provides various functions of the information processing device 100. The processing unit 150 includes a content information acquisition unit 151, a page generation unit 153, and the display control unit 155.

(Content Information Acquisition Unit 151)

The content information acquisition unit 151 acquires a plurality of content information pieces. The content information acquisition unit 151 may acquire a content information piece provided from another device via the communication unit 110, or may acquire a content information piece stored in the storage unit 140.

For example, the plurality of content information pieces are content information pieces provided by a plurality of information services. For example, the plurality of information services includes a news delivery service, a video delivery service, a social network service (SNS), and the like. The video delivery service may be YouTube (registered trademark), and the SNS may be Facebook (registered trademark), mixi (registered trademark), or Twitter (registered trademark). As an example, each of the plurality of content information pieces is a content information piece provided by a different information service. Specifically, for example, each of the plurality of content information pieces may be headline information provided by an information service, summary information of information provided by the information service, or the like.

In addition, at least one of the plurality of content information pieces includes textual information and image information as information elements, for example. As an example, any one of the plurality of content information pieces includes the textual information such as a name of an information service, the headline information or summary information of the information service, and the image information such as a logo of the information service or a headline image of the information service, as the information elements.

Note that, the plurality of content information pieces may be content information pieces provided only by a single information service. As an example, each of the plurality of content information pieces may be a news content information piece provided by the news delivery service. As another example, each of the plurality of content information pieces may be a video content information piece provided by the video delivery service. As a yet another example, each of the plurality of content information pieces may be a post or message content information piece provided by the SNS.

(Page Generation Unit 153)

The page generation unit 153 generates a page in which the plurality of content information pieces are disposed in accordance with templates regarding configurations of the information elements.

Especially in the present embodiment, the page generation unit 153 generates the page in a manner that the plurality of content information pieces are lined up in one direction and the plurality of content information pieces lined up in the one direction are separated from each other by one or more diagonal lines to the one direction. Hereinafter, with reference to FIG. 4, a specific example of this point is described.

Figure 4:
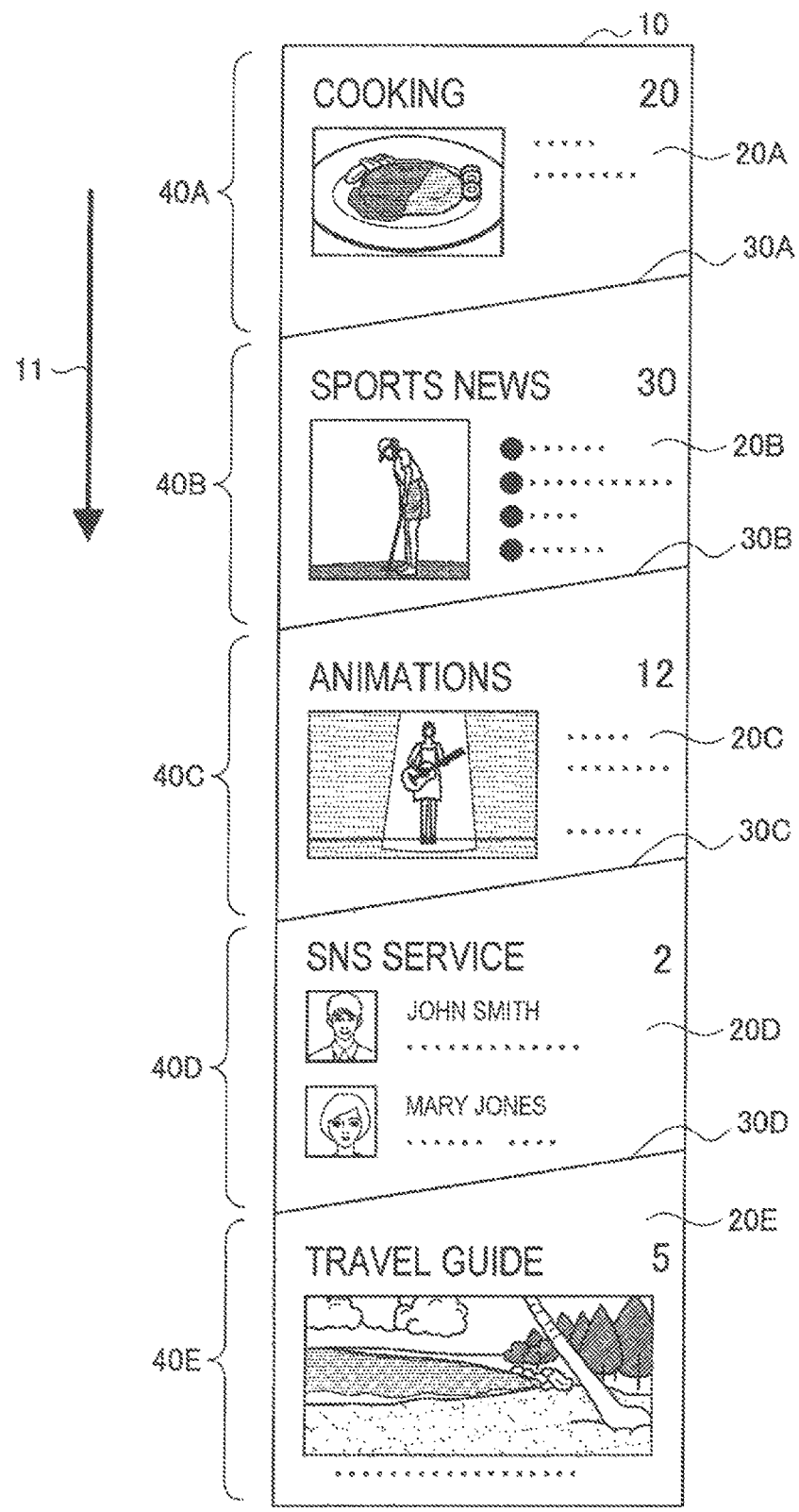
FIG. 4 is an explanatory diagram illustrating a first example of a page generated in an embodiment.

FIG. 4 is an explanatory diagram illustrating a first example of a page generated in the present embodiment. FIG. 4 shows a page 10. The page 10 includes five content information pieces 20 including a content information piece 20A, a content information piece 20B, a content information piece 20C, a content information piece 20D, and a content information piece 20E that are lined up in one direction 11. For example, the content information piece 20A is a content information piece provided by a cooking information delivery service. The content information piece 20B is a content information piece provided by a sports news delivery service. The content information piece 20C is a content information piece provided by a video delivery service. The content information piece 20D is a content information piece provided by an SNS. The content information piece 20E is a content information piece provided by a travel guide service. Each of the content information pieces 20A, 20B, 20C, 20D, and 20E is headline information or summary information of corresponding information service. Each of the content information pieces 20A, 20B, 20C, 20D, and 20E includes textual information and image information as information elements. The information elements of each of the content information pieces 20 are disposed in accordance with corresponding templates (templates regarding configurations of the information elements). In the present embodiment, the content information pieces 20A, 20B, 20C, 20D, and 20E are separated from each other by four diagonal lines 30A, 30B, 30C, and 30D. In other words, the page 10 is divided into five areas 40A, 40B, 40C, 40D, and 40E by the four diagonal lines 30A, 30B, 30C, and 30D. Each of the content information pieces 20 is disposed in the corresponding area 40 in accordance with the corresponding template.

Figure 5:
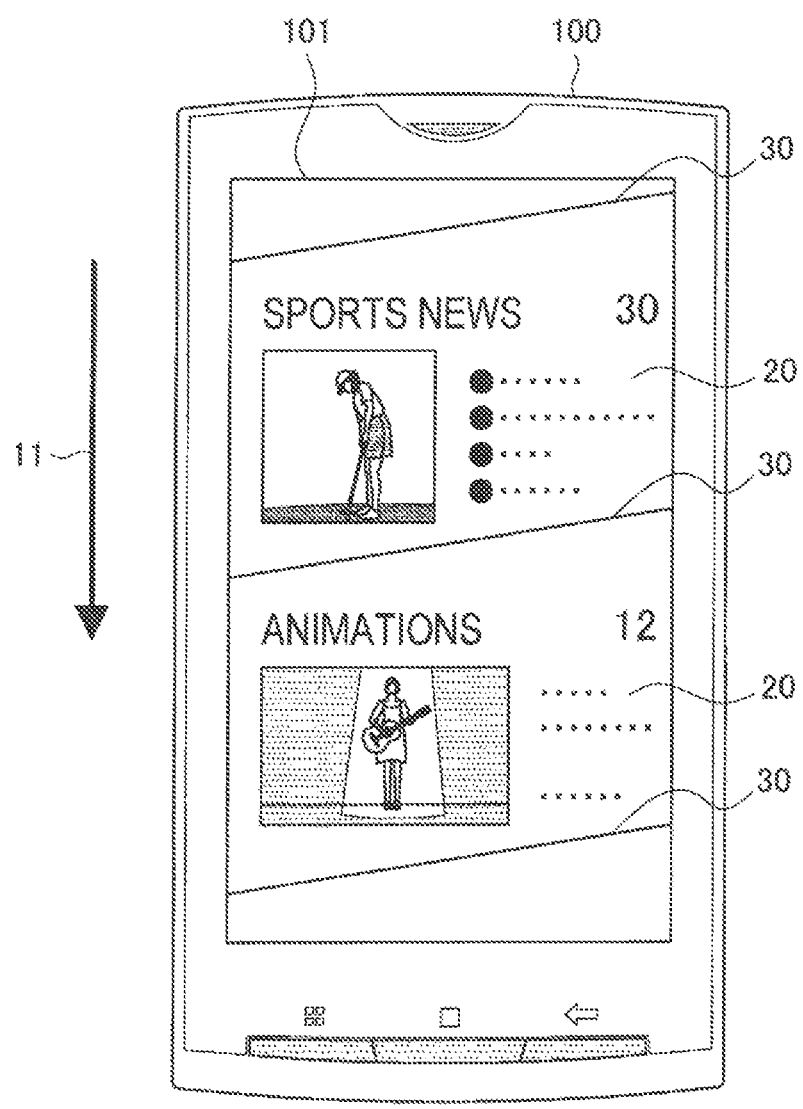
FIG. 5 is an explanatory diagram illustrating an example of a screen showing a part of a page generated in an embodiment.

The page is, for example, information in which all or a part of the page is displayed as a screen. For example, the page may be information on an image itself in which all or a part of the page serves as a screen, or may be information for generating the image (for example, information elements such as textual information and image information, disposal information of the information elements, and the like). Next, with reference to FIG. 5, a specific example of a screen showing a part of a page generated in the present embodiment is described. FIG. 5 is an explanatory diagram illustrating an example of a screen showing a part of a page generated in an embodiment. FIG. 5 shows the information processing device 100. The display device 101 of the information processing device 100 displays a part of the page 10 shown in FIG. 4. Specifically, on the display device 101, the plurality of content information pieces 20 are lined up in the one direction 11 (in other words, vertical direction in the screen) and separated by the diagonal lines 30. As described above, all or a part of the page 10 is displayed as a screen.

The page according to the present embodiment is not limited to the first example described with reference to FIG. 4 (and FIG. 5). Details of another example of the page according to the present embodiment are described later.

As described above, the plurality of content information pieces are separated from each other by the diagonal line in the present embodiment. For example, in the case in which the content information pieces are separated by lines (in other words, horizontal lines in the screen) vertical to the one direction (for example, vertical direction in the screen), the user may feel the list of the content information pieces as monotonous. However, by separating the content information pieces by the diagonal lines, the list of the content information pieces becomes less monotonous. Accordingly, the user can easily recognize an area in which a content information piece is disposed. Therefore, for example, even in a case in which an area of a certain content information piece is long, it may be possible for the user to easily recognize that a subsequent content information piece is a content information piece different from the certain content information piece. Alternatively, it may be possible for the user to easily recognize the boundary between the content information pieces even in the case in which the screen is scrolled quickly and the user browses the content information pieces or searches for a content information piece. Accordingly, it is possible to easily recognize the boundary between the plurality of content information pieces.

Note that, according to the present embodiment, each of the one or more diagonal lines separating the plurality of diagonal lines may be a line having a color different from that of peripheral areas, or may be a boundary between two areas having different colors or patterns. Hereinafter, with reference to FIGS. 6 and 7, a specific example of this point is described.

Figure 6:
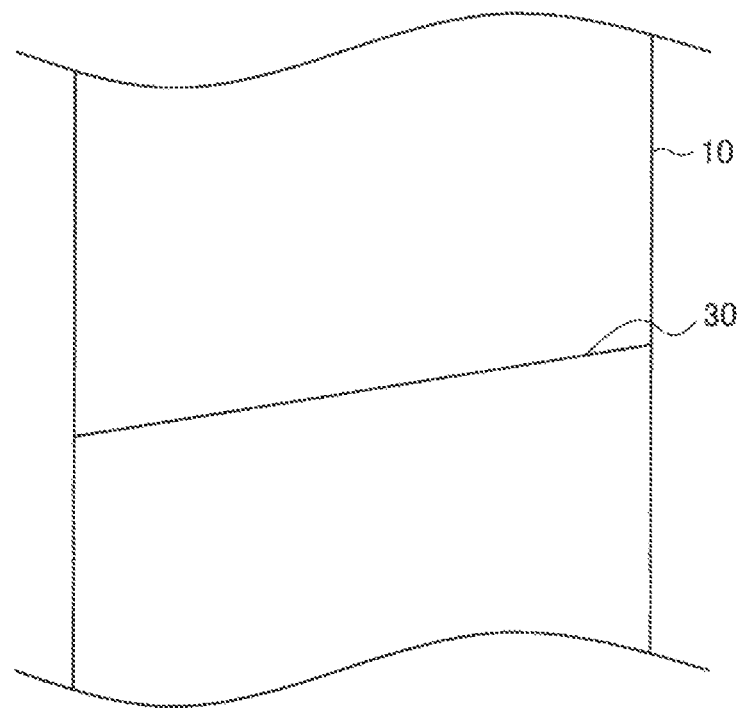
FIG. 6 is an explanatory diagram illustrating a first example of a diagonal line according to an embodiment.

FIG. 6 is an explanatory diagram illustrating a first example of a diagonal line according to the present embodiment. FIG. 6 shows a part of the page 10. In the page 10, the diagonal line 30 is displayed. In this example, the diagonal line 30 is a line having a color different from peripheral areas.

Figure 7:
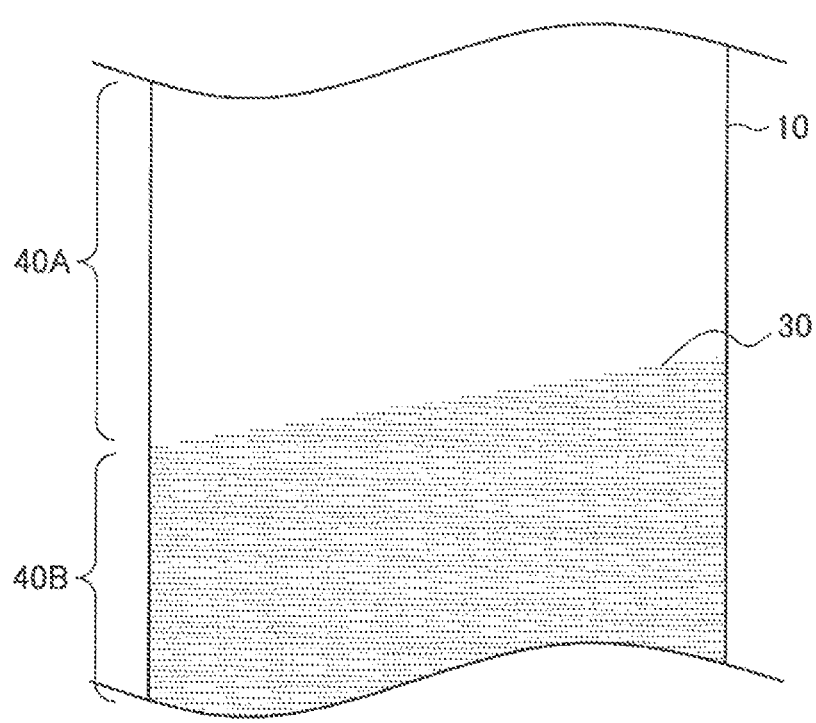
FIG. 7 is an explanatory diagram illustrating a second example of a diagonal line according to an embodiment.

FIG. 7 is an explanatory diagram illustrating a second example of a diagonal line according to the present embodiment. FIG. 7 shows a part of the page 10. In the page 10, the diagonal line 30 is displayed. In this example, the diagonal line 30 is a boundary between the area 40A having a first color (or a first pattern) and the area 40B having a second color (or a second pattern). As described above, according to the present embodiment, the diagonal line 30 does not have to be the line having a color different from peripheral areas as shown in FIG. 6. As shown in FIG. 7, the diagonal line 30 may be the boundary between two areas having different colors or patterns. Note that, it is only necessary that the color or pattern of the area 40A and the color or pattern of the area 40B are different at least in the vicinity of the boundary. They may be identical to each other elsewhere than the vicinity of the boundary. Note that, as an example, the color or pattern of the area 40B (or area 40A) may be a color or pattern of any image. For example, no image may be disposed in the area 40A (at least a part of the area 40A near the boundary), but an image may be disposed in the area 40B (at least a part of the area 40B near the boundary). As a result the diagonal line 30 may be the boundary between the area in which no image is disposed and the area in which an image is disposed.

As shown in FIG. 5, each of the content information pieces may be disposed inside one of the plurality of areas separated by the diagonal lines. Alternatively, as shown in FIG. 8 (to be described later), each of the content information pieces may be partially out of one of the plurality of areas separated by the diagonal lines.

Figure 8:
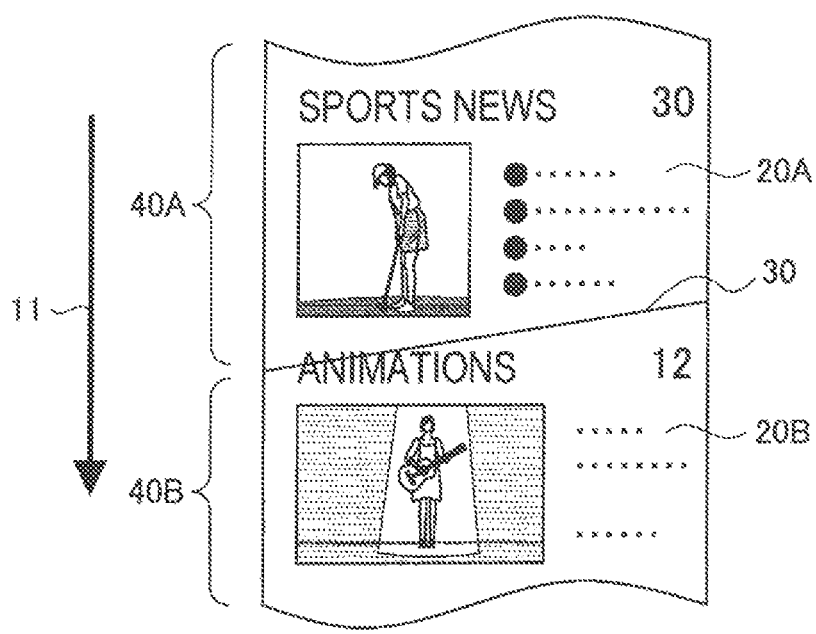
FIG. 8 is an explanatory diagram illustrating an example of a positional relation between a diagonal line and content information pieces according to an embodiment.

FIG. 8 is an explanatory diagram illustrating an example of a positional relation between a diagonal line and content information pieces according to the present embodiment. FIG. 8 shows the content information piece 20A and the content information piece 20B. The content information piece 20A and the content information piece 20B are separated from each other by the diagonal line 30. In this example, the content information piece 20B is partially out of the area 40B separated from the area 40A by the diagonal line 30. In other words, a part of the content information piece 20B is in the area 40B in which the content information piece 20A is disposed. As described above, entire part of a content information piece 20 separated by a diagonal line 30 from another content information piece 20 does not have to be disposed inside a region 40. The content information piece may be partially out of the area 40 separated by the diagonal line.

Note that, the content information piece may be trimmed to follow the diagonal line, instead of being out of the area separated by the diagonal line. For example, an image disposed near the diagonal line may be trimmed to follow the diagonal line, the image being included as an information element in the content information piece.

(Display Control Unit 155)

The display control unit 155 controls display of a screen.

For example, the display control unit 155 generates a screen (image) showing all or a part of the generated page. This point is the same as that described above with reference to FIG. 5. Subsequently, the display control unit 155 causes the display unit 130 to display the generated image.

The functional configuration of the information processing device 100 has been described. For example, the communication unit 110, the input unit 120, the display unit 130, the storage unit 140, and the processing unit 150 may be respectively achieved by the communication interface 907, the touch detection surface 911, the display surface 913, and the storage 905. The processing unit 150 (especially, the content information acquisition unit 151 and the page generation unit 153) may be achieved by the processor 901. Accordingly, the storage 905 or the memory 903 may store a program causing a computer to function as the content information acquisition unit 151 and the page generation unit 153, and the processor 901 may execute the program.

<<3. Specific Example of Page According To Present Embodiment>>

Next, with reference to FIGS. 9 to 18, a specific example of a page according to the present embodiment is described. Next, second to tenth examples other than the first example described with reference to FIG. 4 are described.

(Second Example)

In the second example, the one or more diagonal lines separating a plurality of content information pieces include two or more diagonal lines with different inclinations. Hereinafter, with reference to FIG. 9, a specific example of this point is described.

Figure 9:
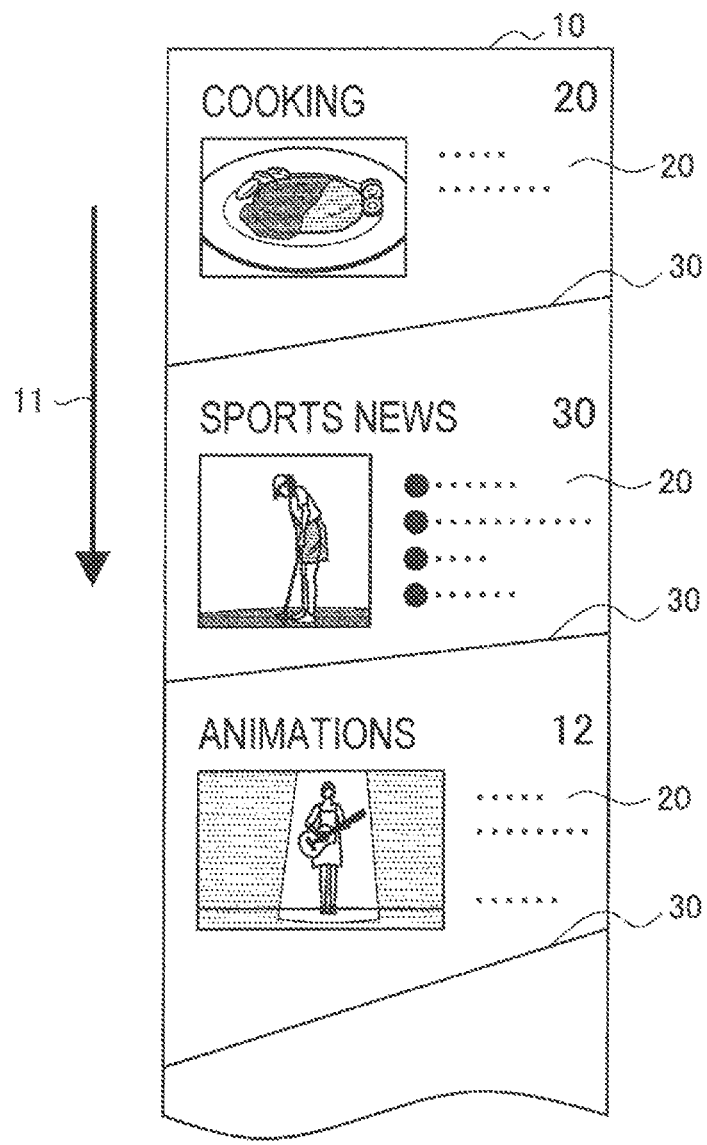
FIG. 9 is an explanatory diagram illustrating a second example of a page generated in an embodiment.

FIG. 9 is an explanatory diagram illustrating the second example of the page generated in the present embodiment. With reference to FIG. 9, the plurality of content information pieces 20 are lined up in the one direction 11 in the page 10. The diagonal lines 30 separating the plurality of content information pieces 20 have different inclinations.

Thereby, the list of the content information pieces in the page becomes less monotonous. Accordingly, the user can easily recognize an area in which a content information piece is disposed.

(Third Example)

In the third example, the one or more diagonal lines separating the plurality of content information pieces include a diagonal line inclined in a first rotation direction with respect to the one direction in which the plurality of content information pieces are lined up, and a diagonal line inclined in a second rotation direction opposite to the first rotation direction. In addition, a content information piece adjacent to two content information pieces among the plurality of content information pieces is separated from one of the two content information pieces by the diagonal line inclined in the first rotation direction, and is separated from the other of the two content information pieces by the diagonal line inclined in the second rotation direction. The page generation unit 153 generates the page as described above. Hereinafter, with reference to FIG. 10, a specific example of this point is described.

Figure 10:
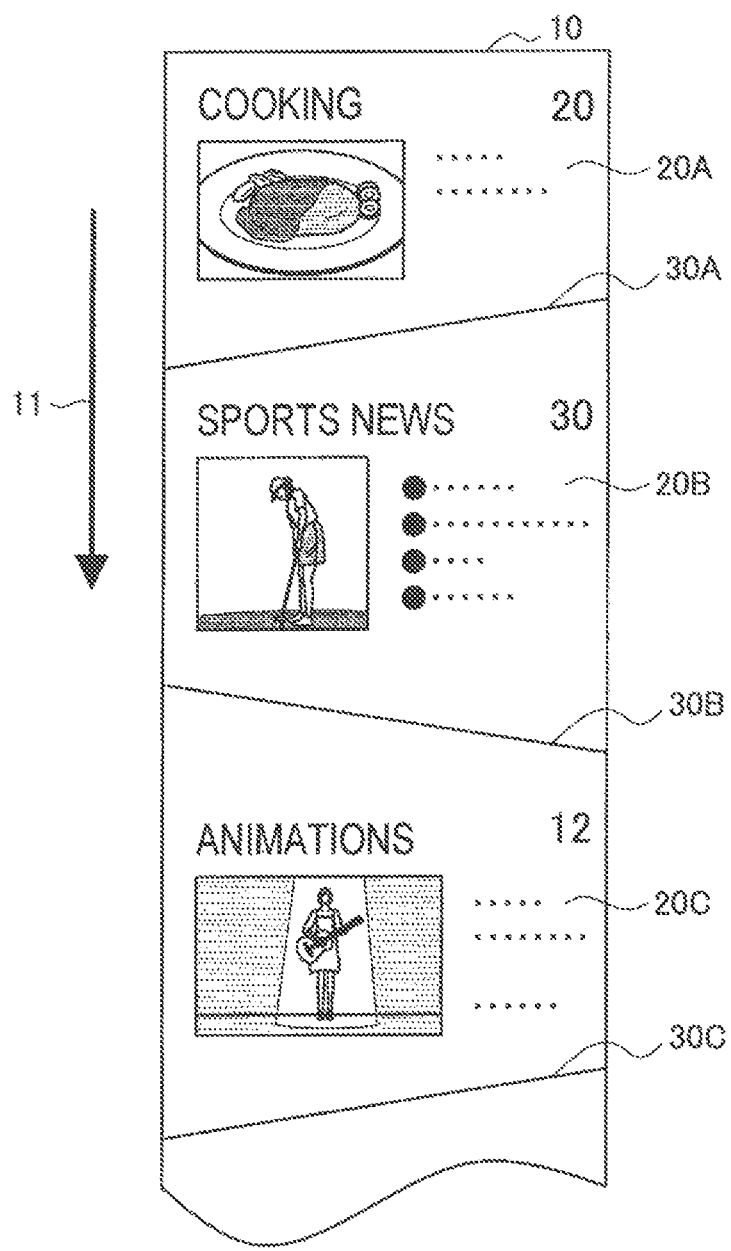
FIG. 10 is an explanatory diagram illustrating a third example of a page generated in an embodiment.

FIG. 10 is an explanatory diagram illustrating the third example of the page generated in the present embodiment. With reference to FIG. 10, the plurality of content information pieces 20 are lined up in the one direction 11 in the page 10. The content information piece 20B is adjacent to the content information piece 20A and the content information piece 20C. The content information piece 20B is separated from the content information piece 20A by the diagonal line 30A inclined in the first rotation direction (clockwise direction) with respect to the one direction 11, and is separated from the content information piece 20C by the diagonal line 30B inclined in the second rotation direction (counterclockwise direction) with respect to the one direction 11.

Thereby, the list of the content information pieces in the page becomes less monotonous. Accordingly, the user can easily recognize an area in which a content information piece is disposed.

(Fourth Example)

In the fourth example, in a way similar to the third example, the one or more diagonal lines separating the plurality of content information pieces include a diagonal line inclined in a first rotation direction with respect to the one direction in which the plurality of content information pieces are lined up, and a diagonal line inclined in a second rotation direction opposite to the first rotation direction. However, one of two adjacent content information pieces among the plurality of content information pieces is sandwiched between two diagonal lines inclined in the first rotation direction, and the other of the two adjacent content information pieces is sandwiched between two diagonal lines inclined in the second rotation direction. The page generation unit 153 generates the page as described above. Hereinafter, with reference to FIG. 11, a specific example of this point is described.

Figure 11:
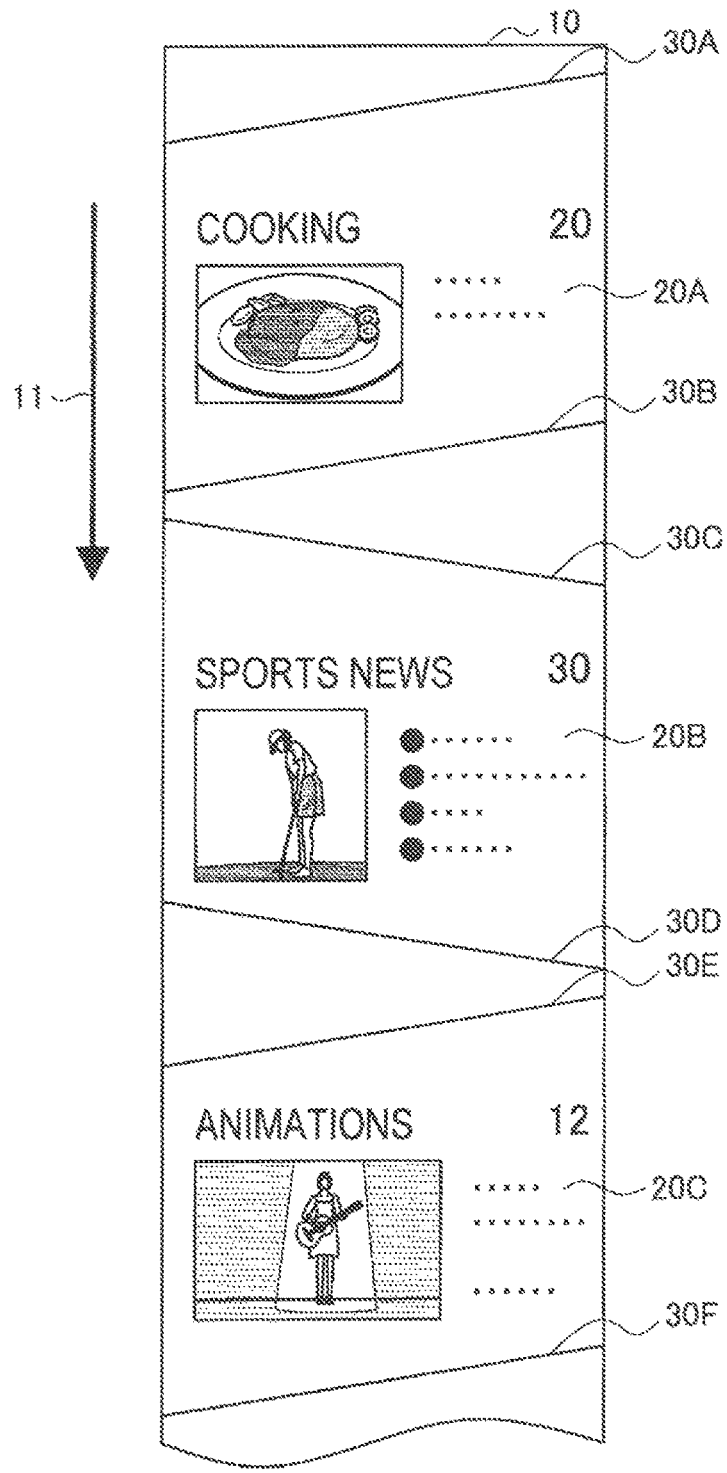
FIG. 11 is an explanatory diagram illustrating a fourth example of a page generated in an embodiment.

FIG. 11 is an explanatory diagram illustrating the fourth example of the page generated in the present embodiment. With reference to FIG. 11, the plurality of content information pieces 20 are lined up in the one direction 11 in the page 10. The content information piece 20A is sandwiched between the diagonal lines 30A and 30B inclined in the first rotation direction (clockwise direction) with respect to the one direction 11. In a similar way, the content information piece 20C is sandwiched between diagonal lines 30E and 30F inclined in the first rotation direction (clockwise direction) with respect to the one direction 11. On the other hand, the content information piece 20B adjacent to the content information pieces 20A and 20C is sandwiched between the diagonal lines 30C and 30D inclined in the second rotation direction (counterclockwise direction) with respect to the one direction 11.

Thereby, the list of the content information pieces in the page becomes less monotonous. Accordingly, the user can easily recognize an area in which a content information piece is disposed.

Note that, a distance between a diagonal line closer to the other of the two adjacent content information pieces from among the two diagonal lines inclined in the first rotation direction, and a diagonal line closer to the one of the two adjacent content information pieces from among the two diagonal lines inclined in the second rotation direction may be decided depending on at least one of the two adjacent content information pieces. In other words, in FIG. 11, a distance between the diagonal line 30B and the diagonal line 30C may be decided depending on at least one of the content information piece 20A and the content information piece 20B. In addition, a distance between the diagonal line 30D and the diagonal line 30E may be decided depending on at least one of the content information piece 20B and the content information piece 20C. For example, the distance between the diagonal line 30B and the diagonal line 30C may increase in proportion to an amount of the content information piece 20A, and the distance between the diagonal line 30D and the diagonal line 30E may increase in proportion to an amount of the content information piece 20B, Accordingly, for example, it is possible for the user to easily recognize the boundary depending on the content information piece. As an example, in the case in which the amount of the content information piece increases, a wide margin is generated by increasing the distance. As a result, the user can easily recognize the boundary between the content information pieces even in a case in which the screen is scrolled quickly since there is a large amount of content information pieces, for example.

(Fifth Example)

In the fifth example, two adjacent content information pieces among the plurality of content information pieces are separated by two or more diagonal lines. The two or more diagonal lines are inclined at different inclinations in an identical rotation direction with respect to the one direction. The page generation unit 153 generates the page as described above. Hereinafter, with reference to FIG. 12, a specific example of this point is described.

Figure 12:
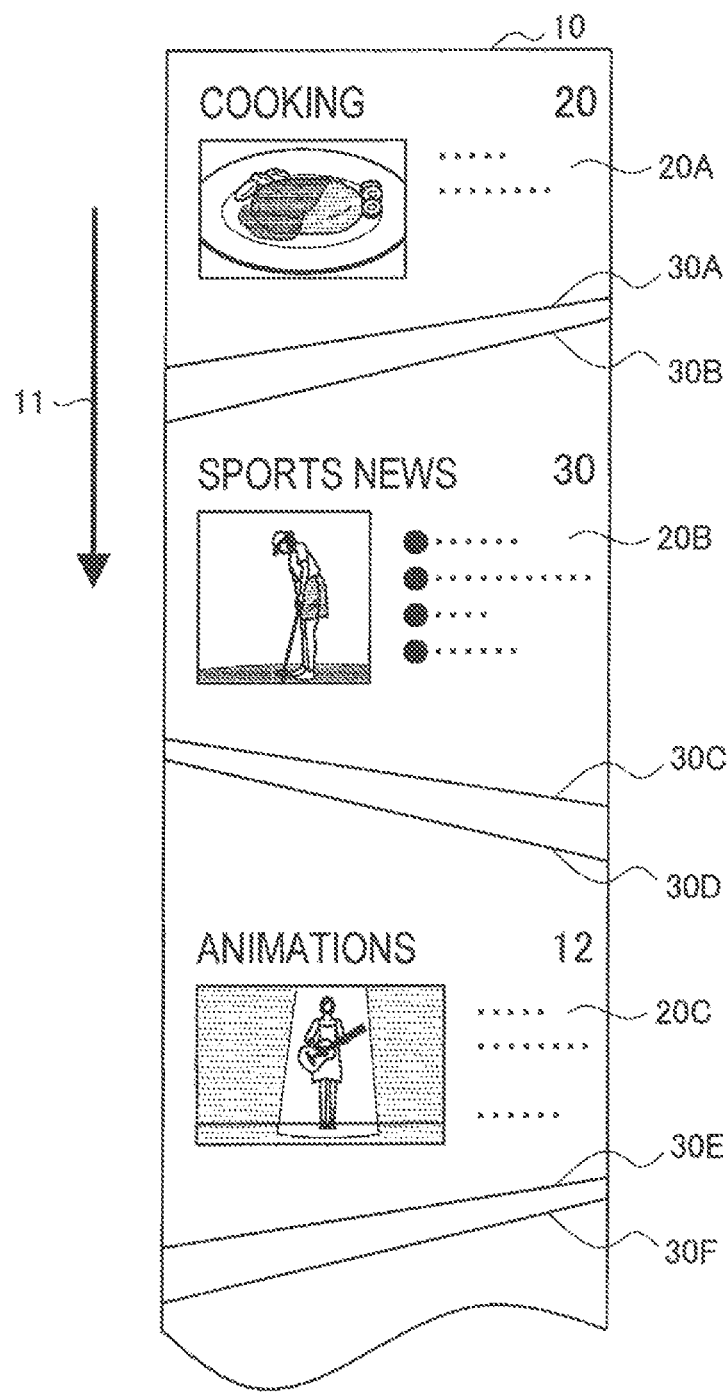
FIG. 12 is an explanatory diagram illustrating a fifth example of a page generated in an embodiment.

FIG. 12 is an explanatory diagram illustrating the fifth example of the page generated in the present embodiment. With reference to FIG. 12, in the page 10, the adjacent content information pieces 20A and 20B are separated by the diagonal lines 30A and 30B inclined at different inclinations in an identical rotation direction (clockwise direction). In addition, the adjacent content information pieces 20B and 20C are separated by the diagonal lines 30C and 30D inclined at different inclinations in an identical rotation direction (counterclockwise direction).

Thereby, the list of the content information pieces in the page becomes less monotonous. Accordingly, the user can easily recognize an area in which a content information piece is disposed.

Note that, the difference between the inclinations of the two or more diagonal lines inclined in the identical direction may be decided depending on at least one of the two adjacent content information pieces. In other words, in FIG. 12, the difference between the inclinations of the diagonal line 30A and the diagonal line 30B may be decided depending on at least one of the content information piece 20A and the content information piece 20B. In addition, the difference between the inclinations of the diagonal line 30C and the diagonal line 30D may be decided depending on at least one of the content information piece 20B and the content information piece 20C. For example, the difference between the inclinations of the diagonal line 30A and the diagonal line 30B may increase in proportion to an amount of the content information piece 20A, and the difference between the inclinations of the diagonal line 30C and the diagonal line 30D may increase in proportion to an amount of the content information piece 20B, Accordingly, for example, it is possible for the user to easily recognize the boundary depending on the content information piece. As an example, in the case in which the amount of the content information piece increases, the diagonal line becomes easily-noticeable by increasing the difference between the inclinations. As a result, for example, the user can easily recognize the boundary between the content information pieces even in a case in which the screen is scrolled quickly since there is a large amount of content information pieces.

(Sixth Example)

In the sixth example, two adjacent content information pieces among the plurality of content information pieces are separated by two or more diagonal lines with different inclinations. In addition, when a screen of a region including the two or more diagonal lines in the page is generated, a relative positional relation between the two or more diagonal lines changes depending on the region. The page generation unit 153 generates the page as described above. Hereinafter, with reference to FIGS. 13 and 14, a specific example of this point is described.

Figure 13:
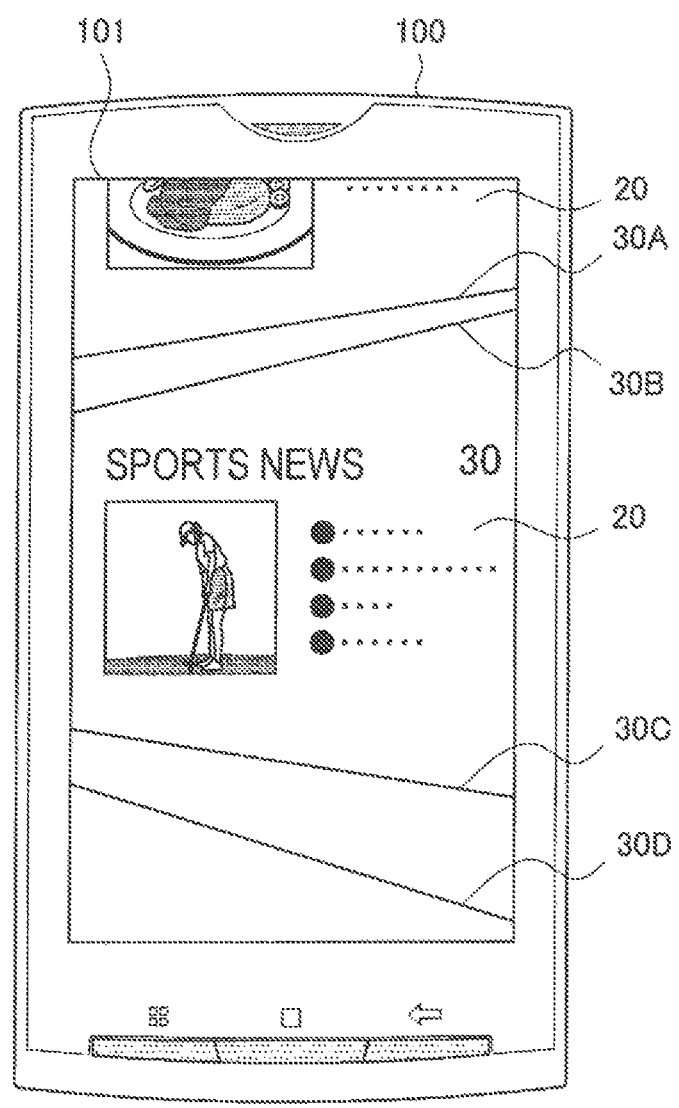
FIG. 13 is a first explanatory diagram illustrating a sixth example of a page generated in an embodiment.
Figure 14:
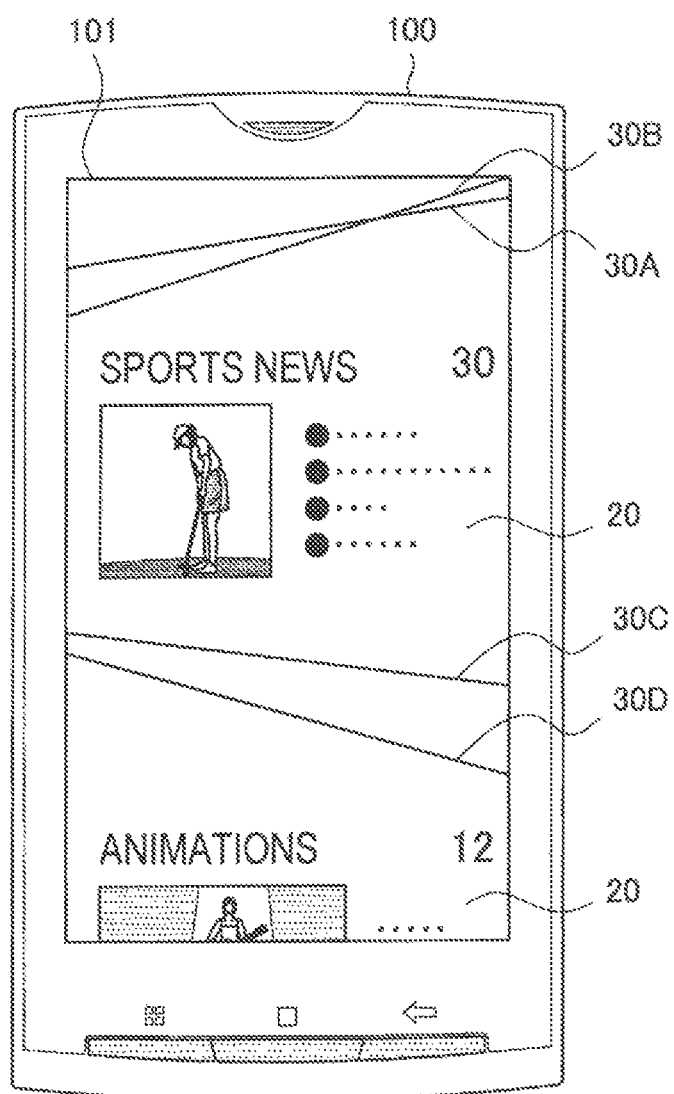
FIG. 14 is a second explanatory diagram illustrating the sixth example of the page generated in the embodiment.

FIG. 13 and FIG. 14 are each an explanatory diagram illustrating the sixth example of the page generated in the present embodiment. First, FIG. 13 shows the information processing device 100, and the display device 101 displays an image showing a region of the page. The adjacent content information pieces 20 are separated by the diagonal lines 30A and 30B with different inclinations. As shown in FIG. 14, a relative positional relation between the diagonal lines 30A and 30B changes when the screen is scrolled in a lower direction of the screen. Note that, the same applies to the diagonal lines 30C and 30D.

As described above, the relative positional relation between the diagonal lines changes when the region of the page to be on the screen changes. Accordingly, for example, it may be possible for the user to easily recognize the boundary when the region of the page to be displayed is changed by scrolling the screen or the like.

(Seventh Example)

In the seventh example, an inclination of each diagonal line included in the one or more diagonal lines separating the plurality of content information pieces is decided depending on at least one content information piece separated by the each diagonal line. Alternatively, for example, an inclination of each diagonal line included in the one or more diagonal lines may be decided on the basis of an amount of at least one of two content information pieces separated by the each diagonal line. Hereinafter, with reference to FIG. 15, a specific example of this point is described.

Figure 15:
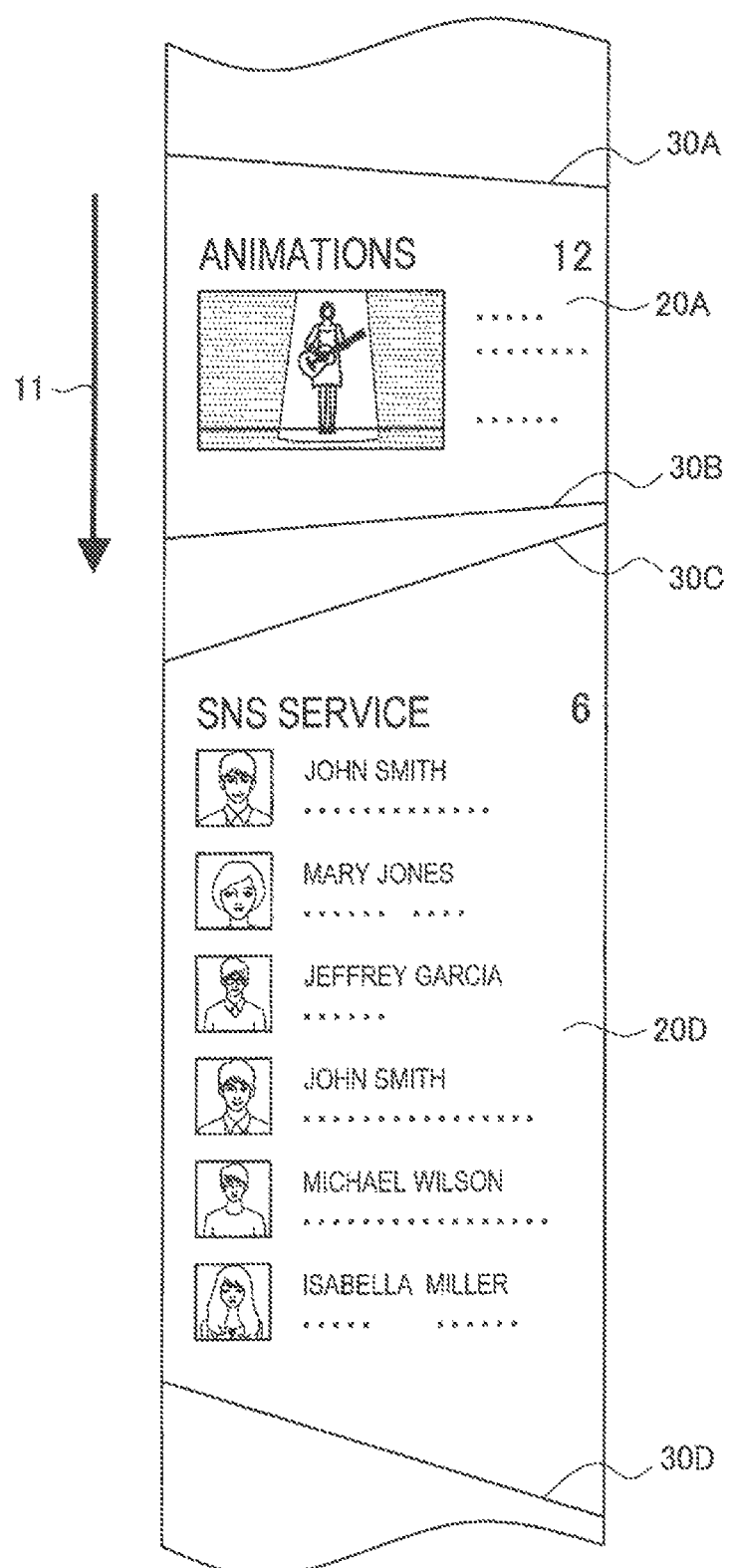
FIG. 15 is an explanatory diagram illustrating a seventh example of a page generated in an embodiment.

FIG. 15 is an explanatory diagram illustrating the seventh example of the page generated in the present embodiment. With reference to FIG. 15, in the page 10, inclinations of the diagonal lines 30A and 30B (with respect to the one direction 11) are decided depending on an amount of the content information piece 20 A separated by the diagonal lines 30A and 30B from other content information pieces. As a result, the inclinations of the diagonal lines 30A and 30B are huge. On the other hand, inclinations of the diagonal lines 30C and 30D (with respect to the one direction 11) are decided depending on an amount of the content information piece 20 B separated by the diagonal lines 30C and 30D from other content information pieces. As a result, the inclinations of the diagonal lines 30C and 30D become smaller.

Accordingly, it is possible for the user to easily recognize the boundary depending on the content information piece. As an example, in the case in which the amount of the content information piece increases, the diagonal line becomes easily-noticeable by reducing the inclinations (with respect to the one direction 11). As a result, the user can easily recognize the boundary between the content information pieces even in a case in which the screen is scrolled quickly since there is a large amount of content information pieces. Since the user can recognize the amount of the content information pieces from the inclinations, convenience of the user can be improved at a time of browsing the content information pieces.

Note that, an inclination of each diagonal line included in the one or more diagonal lines may be decided on the basis of an amount of information provided by an information service corresponding to at least one of two content information pieces separated by the each diagonal line. As an example, the inclination to the one direction may become smaller in a case in which the content information piece corresponds to a news delivery service and an amount of information provided by the SNS service (for example, an amount of new news) is larger. On the other hand, the inclination to the one direction becomes larger in a case in which the amount of information is smaller.

Accordingly, for example, it is possible for the user to easily recognize the boundary depending on the amount of information provided by the information service corresponding to the content information piece.

(Eighth Example)

In the eighth example, an area of the page separated by one or two diagonal lines among the one or more diagonal lines separating the plurality of content information pieces has a color or pattern different from that of another area adjacent to the area. Hereinafter, with reference to FIG. 16, a specific example of this point is described.

Figure 16:
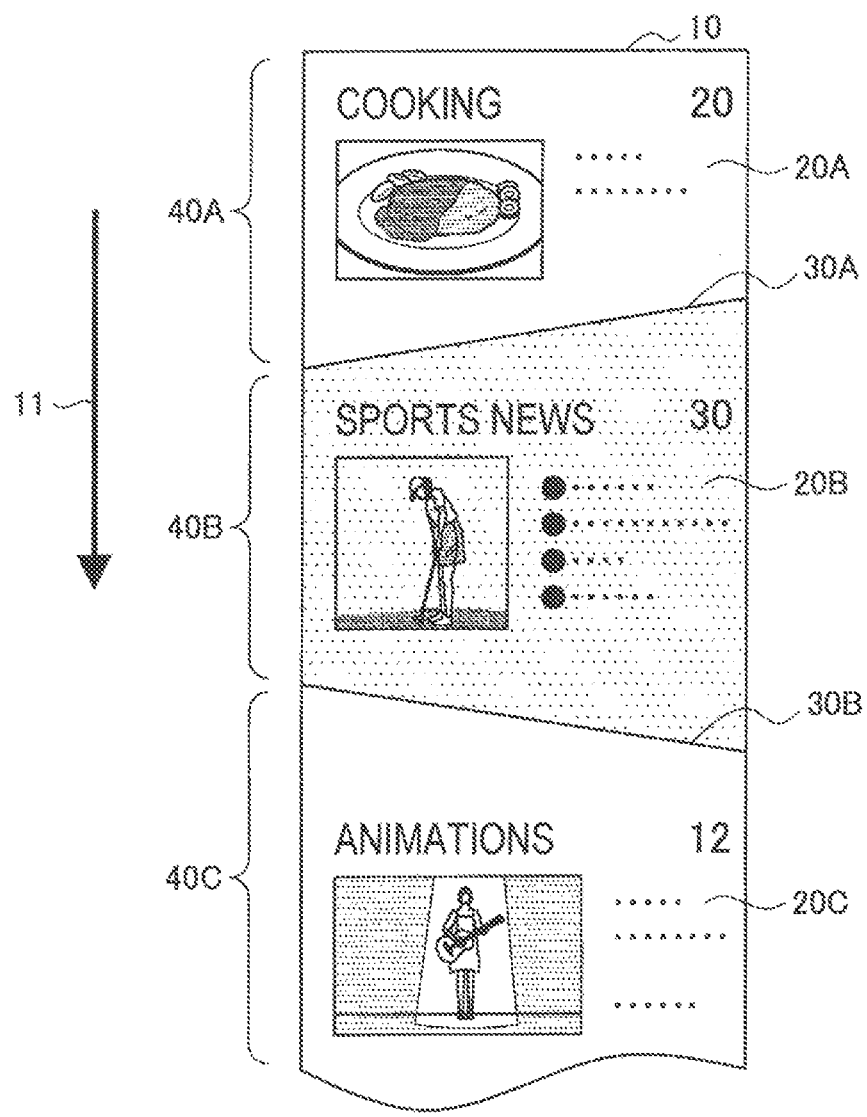
FIG. 16 is an explanatory diagram illustrating an eighth example of a page generated in an embodiment.

FIG. 16 is an explanatory diagram illustrating the eighth example of the page generated in the present embodiment. With reference to FIG. 16, the plurality of content information pieces 20 are lined up in the one direction 11 in the page 10. The page 10 is divided into the areas 40A, 40B, and 40C by the diagonal lines 30A, 30B, and 30C. The area 40B has a color or pattern different from those of the adjacent areas 40A and 40C.

Accordingly, it is possible for the user to easily recognize the separation by the diagonal lines.

(Ninth Example)

Also in the ninth example, in a way similar to the eighth example, an area of the page separated by one or two diagonal lines among the one or more diagonal lines separating the plurality of content information pieces has a color or pattern different from that of another area adjacent to the area. In addition, among the plurality of content information pieces lined up in the one direction, even-numbered or odd-numbered content information pieces are each disposed in areas of the page separated by one or two diagonal lines among the one or more diagonal lines, the areas having an identical color or pattern. Hereinafter, with reference to FIG. 17, a specific example of this point is described.

Figure 17:
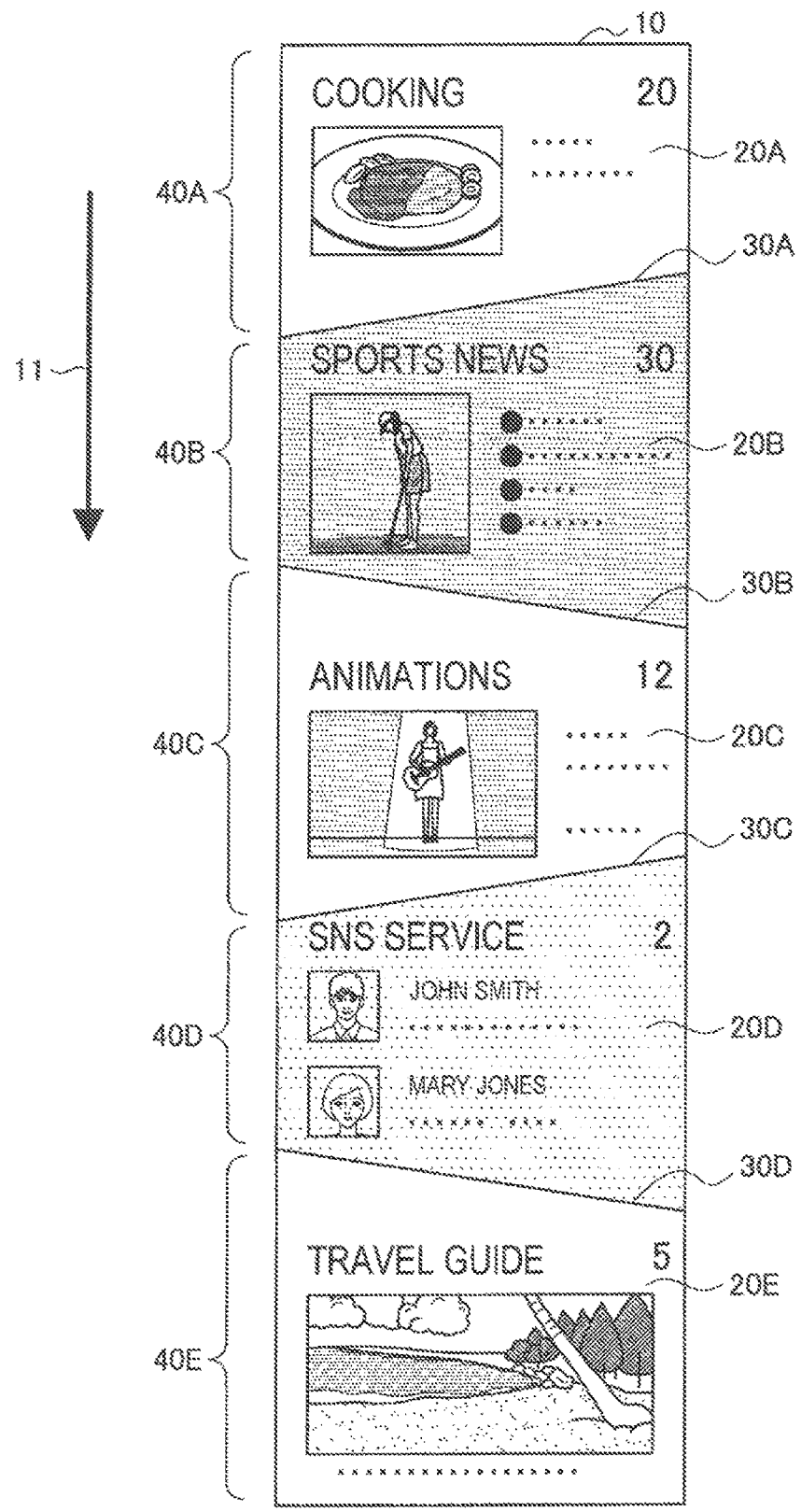
FIG. 17 is an explanatory diagram illustrating a ninth example of a page generated in an embodiment.

FIG. 17 is an explanatory diagram illustrating the ninth example of the page generated in the present embodiment. With reference to FIG. 17, in the page 10, odd-numbered content information pieces 20A, 20C and 20E among the five content information pieces 20 lined up in the one direction 11 have an identical color or pattern, and even-numbered content information pieces 20B and 20D have another color or pattern.

Accordingly, for example, it is possible for the user to easily recognize the separation by the diagonal lines and also to easily recognize a shift to another content information piece.

(Tenth Example)

In the tenth example, the one or more diagonal lines separating the plurality of content information pieces include a first diagonal line and a second diagonal line that are adjacent to each other, a third diagonal line adjacent to the first diagonal line, and a fourth diagonal line adjacent to the second diagonal line. In addition, the page includes a first area separated by the first diagonal line and the second diagonal line, a second area separated by the first diagonal line and the third diagonal line, and a third area separated by the second diagonal line and the fourth diagonal line. In addition, the first area is an area in which one of the plurality of content information pieces is disposed, and has a color depending on a color of the second area and a color of the third area. Hereinafter, with reference to FIG. 18, a specific example of this point is described.

Figure 18:
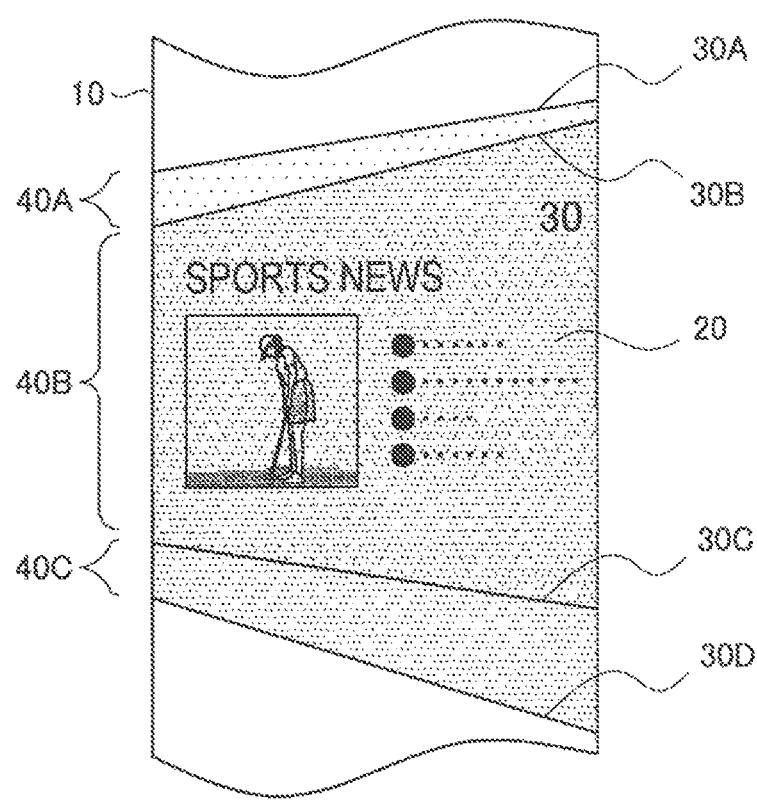
FIG. 18 is an explanatory diagram illustrating a tenth example of a page generated in an embodiment.

FIG. 18 is an explanatory diagram illustrating the tenth example of the page generated in the present embodiment. With reference to FIG. 18, the page 10 includes the diagonal line 30B and the diagonal line 30C that are adjacent to each other, the diagonal line 30A adjacent to the diagonal line 30B, and the diagonal line 30D adjacent to the diagonal line 30C. In addition, the page 10 includes the area 40B separated by the diagonal lines 30B and 30C, the area 40A separated by the diagonal lines 30B and 30A, and the area 40C separated by the diagonal lines 30C and 30D. In addition, the area 40B is an area in which the content information piece 20 is disposed, and has a color depending on a color of the area 40A and a color of the area 40B (for example, a color obtained by mixing the color of the area 40A and the color of the area 40B).

Accordingly, for example, the area in which the content information piece is disposed is emphasized. Therefore, for example, it is possible for the user to easily recognize a shift between content information pieces.

<<4. Flow of Processing>>

Figure 19:
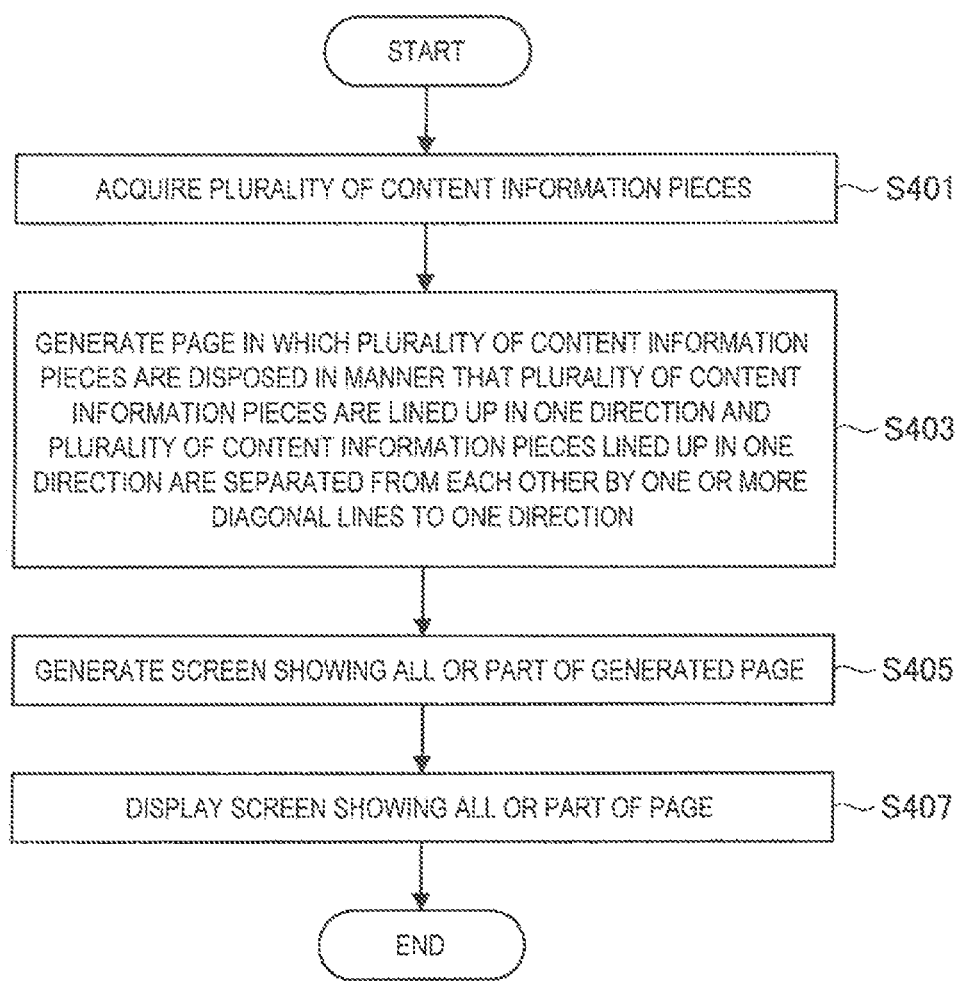
FIG. 19 is a flowchart showing an example of a schematic flow of information processing according to an embodiment.

Next, with reference to FIG. 19, an example of information processing according to the present embodiment is described. FIG. 19 is a flowchart showing an example of a schematic flow of the information processing according to the present embodiment.

First, the content information acquisition unit 151 acquires a plurality of content information pieces (S401).

Next, the page generation unit 153 generates the page in a manner that the plurality of content information pieces are lined up in one direction and the plurality of content information pieces lined up in the one direction are separated from each other by one or more diagonal lines to the one direction (S403).

Subsequently, the display control unit 155 generates a screen (image) showing all or a part of the generated page (S405). The display control unit 155 then causes the display unit 130 to display the generated image (screen showing all or a part of the page) (S407). Subsequently, the process ends.

<<5. Alteration>>

Next, an alternation of the present embodiment is described.

(First Alteration)

As described above, the example in which the information processing device 100 according to the embodiment of the present disclosure is a smartphone has been described. However, the information processing device 100 according to the embodiment of the present disclosure is not limited thereto.

The information processing device 100 may be another terminal device such as a tablet terminal, a personal computer (PC), a personal digital assistant, an electronic book terminal, an automotive navigation system, or a video game console.

(Second Alteration)

In addition, the example in which the information processing device 100 according to the embodiment of the present disclosure is a terminal device preloaded with the content information acquisition unit 151 and the page generation unit 153 has been described. In other words, the example in which the terminal device stores and executes a program causing a computer to function as the content information acquisition unit 151 and the page generation unit 153 has been described as an example. However, the embodiment of the present disclosure is not limited thereto.

For example, another device (for example, a server) may provide the program causing the computer to function as the content information acquisition unit 151 and the page generation unit 153 to the terminal device as needed (for example, in response to a request from the terminal device). Subsequently, the terminal device acquires and executes the provided program (by a processor).

(Third Alteration)

In addition, the example in which the information processing device 100 according to the embodiment of the present disclosure is a terminal device has been described. However, the information processing device 100 according to the embodiment of the present disclosure is not limited thereto.

For example, the information processing device 100 may be a server including the content information acquisition unit 151 and the page generation unit 153. The information processing device 100 may provide a generated page to a terminal device including the display unit 130 and the display control unit 155.

<<6. Conclusion>>

With reference to FIGS. 1 to 19, the information processing device and processing according to the embodiment of the present disclosure have been described. According to the embodiment of the present disclosure, the content information acquisition unit 151 acquires a plurality of content information pieces. The page generation unit 153 generates a page in which the plurality of content information pieces are disposed in accordance with templates regarding configurations of the information elements. The page generation unit 153 generates the page in a manner that the plurality of content information pieces are lined up in one direction and the plurality of content information pieces lined up in the one direction are separated from each other by one or more diagonal lines to the one direction.

For example, in the case in which the content information pieces are separated by lines (in other words, horizontal lines in the screen) vertical to the one direction (for example, vertical direction in the screen), the user may feel the list of the content information pieces as monotonous. However, by separating the content information pieces by the diagonal lines as described above, the list of the content information pieces becomes less monotonous. Accordingly, the user can easily recognize an area in which a content information piece is disposed. Accordingly, for example, even in a case in which an area of a certain content information piece is long, it may be possible for the user to easily recognize that a subsequent content information piece is a content information piece different from the certain content information piece. Alternatively, for example, it may be possible for the user to easily recognize the boundary between the content information pieces even in the case in which the screen is scrolled quickly and the user browses the content information pieces or searches for a content information piece. Accordingly, it is possible to easily recognize the boundary between the plurality of content information pieces.

In the second example, the one or more diagonal lines separating a plurality of content information pieces include two or more diagonal lines with different inclinations.

Thereby, the list of the content information pieces in the page becomes less monotonous. Accordingly, the user can easily recognize an area in which a content information piece is disposed.

In the third example, the one or more diagonal lines separating the plurality of content information pieces include a diagonal line inclined in a first rotation direction with respect to the one direction in which the plurality of content information pieces are lined up, and a diagonal line inclined in a second rotation direction opposite to the first rotation direction. In addition, a content information piece adjacent to two content information pieces among the plurality of content information pieces is separated from one of the two content information pieces by the diagonal line inclined in the first rotation direction, and is separated from the other of the two content information pieces by the diagonal line inclined in the second rotation direction.

Thereby, the list of the content information pieces in the page becomes less monotonous. Accordingly, the user can easily recognize an area in which a content information piece is disposed.

In the fourth example, the one or more diagonal lines separating the plurality of content information pieces include a diagonal line inclined in a first rotation direction with respect to the one direction in which the plurality of content information pieces are lined up, and a diagonal line inclined in a second rotation direction opposite to the first rotation direction. In addition, one of two adjacent content information pieces among the plurality of content information pieces is sandwiched between two diagonal lines inclined in the first rotation direction, and the other of the two adjacent content information pieces is sandwiched between two diagonal lines inclined in the second rotation direction.

Thereby, the list of the content information pieces in the page becomes less monotonous. Accordingly, the user can easily recognize an area in which a content information piece is disposed.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the example in which the content information pieces are lined up in the vertical direction in the page has been explained. However, the present disclosure is not limited thereto. For example, the content information pieces may be lined up in a horizontal direction in the page.

Also, the processing steps in information processing in this specification are not strictly limited to being executed in a time series following the sequence described in a flowchart. For example, the processing steps in an information processing may be executed in a sequence that differs from a sequence described herein as a flowchart, and furthermore may be executed in parallel.

In addition, it is also possible to create a computer program for causing a hardware such as a CPU, ROM, and RAM, which are embedded in an information processing device, to execute functions equivalent to the configurations of the information processing device. Moreover, it may be possible to provide a recording medium having the computer program stored therein. Moreover, it may be possible to provide an information processing device (for example, processing circuit or chip) including memory (for example, ROM and RAM) storing the computer program and a processor (for example, CPU) executing the computer program.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

an acquisition unit that acquires a plurality of content information pieces; and a generation unit that generates a page in which the plurality of content information pieces are disposed in accordance with templates regarding configurations of information elements, wherein the generation unit generates the page in a manner that the plurality of content information pieces are lined up in one direction and the plurality of content information pieces lined up in the one direction are separated from each other by one or more diagonal lines to the one direction.

(2)

The information processing device according to (1), wherein the one or more diagonal lines include two or more diagonal lines with different inclinations.

(3)

The information processing device according to (2), wherein the one or more diagonal lines include a diagonal line inclined in a first rotation direction with respect to the one direction, and a diagonal line inclined in a second rotation direction opposite to the first rotation direction.

(4)

The information processing device according to (3), wherein the generation unit generates the page in a manner that a content information piece adjacent to two content information pieces among the plurality of content information pieces is separated from one of the two content information pieces by the diagonal line inclined in the first rotation direction, and is separated from the other of the two content information pieces by the diagonal line inclined in the second rotation direction.

(5)

The information processing device according to (3) or (4), wherein the generation unit generates the page in a manner that one of two adjacent content information pieces among the plurality of content information pieces is sandwiched between two diagonal lines inclined in the first rotation direction, and the other of the two adjacent content information pieces is sandwiched between two diagonal lines inclined in the second rotation direction.

(6)

The information processing device according to (5), wherein the generation unit decides a distance between a diagonal line closer to the other of the two adjacent content information pieces from among the two diagonal lines inclined in the first rotation direction, and a diagonal line closer to the one of the two adjacent content information pieces from among the two diagonal lines inclined in the second rotation direction, depending on at least one of the two adjacent content information pieces.

(7)

The information processing device according to any one of (2) to (6), wherein the generation unit generates the page in a manner that two adjacent content information pieces among the plurality of content information pieces are separated by two or more diagonal lines, and wherein the two or more diagonal lines are inclined at different inclinations in an identical rotation direction with respect to the one direction.

(8)

The information processing device according to (7), wherein the generation unit decides a difference between the inclinations of the two or more diagonal lines, depending on at least one of the two adjacent content information pieces.

(9)

The communication control device according to any one of (2) to (8), wherein the generation unit generates the page in a manner that two adjacent content information pieces among the plurality of content information pieces are separated by two or more diagonal lines with different inclinations and, when a screen of a region including the two or more diagonal lines in the page is generated, a relative positional relation between the two or more diagonal lines changes depending on the region.

(10)

The information processing device according to any one of (1) to (9), wherein the generation unit decides an inclination of each diagonal line included in the one or more diagonal lines, depending on at least one content information piece separated by the each diagonal line.

(11)

The information processing device according to (10), wherein the generation unit decides an inclination of each diagonal line included in the one or more diagonal lines on the basis of an amount of at least one of two content information pieces separated by the each diagonal line.

(12)

The information processing device according to (10), wherein the generation unit decides an inclination of each diagonal line included in the one or more diagonal lines on the basis of an amount of information provided by an information service corresponding to at least one of two content information pieces separated by the each diagonal line.

(13)

The information processing device according to any one of (1) to (12), wherein an area of the page separated by one or two diagonal lines among the one or more diagonal lines has a color or pattern different from a color or pattern of another area adjacent to the area.

(14)

The information processing device according to (13), wherein, among the plurality of content information pieces lined up in the one direction, even-numbered or odd-numbered content information pieces are each disposed in areas of the page separated by one or two diagonal lines among the one or more diagonal lines, the areas having an identical color or pattern.

(15)

The information processing device according to (13), wherein the one or more diagonal lines include a first diagonal line and a second diagonal line that are adjacent to each other, a third diagonal line adjacent to the first diagonal line, and a fourth diagonal line adjacent to the second diagonal line, wherein the page includes a first area separated by the first diagonal line and the second diagonal line, a second area separated by the first diagonal line and the third diagonal line, and a third area separated by the second diagonal line and the fourth diagonal line, and wherein the first area is an area in which one of the plurality of content information pieces is disposed, and has a color depending on a color of the second area and a color of the third area.

(16)

The information processing device according to any one of (1) to (15), wherein each of the one or more diagonal lines is a boundary between two areas having different colors or patterns.

(17)

The information processing device according to any one of (1) to (16), wherein the plurality of content information pieces are content information pieces provided by a plurality of information services.

(18)

The information processing device according to any one of (1) to (17), wherein at least one of the plurality of content information pieces includes textual information and image information as information elements.

(19)

An information processing method executed by an information processing device, the information processing method including:

acquisition of a plurality of content information pieces; and generation of a page in which the plurality of content information pieces are disposed in accordance with templates regarding configurations of information elements, wherein the generation of the page includes generation of the page in a manner that the plurality of content information pieces are lined up in one direction and the plurality of content information pieces lined up in the one direction are separated from each other by one or more diagonal lines to the one direction.

(20)

A program causing a computer to function as:

an acquisition unit that acquires a plurality of content information pieces; and a generation unit that generates a page in which the plurality of content information pieces are disposed in accordance with templates regarding configurations of information elements, wherein the generation unit generates the page in a manner that the plurality of content information pieces are lined up in one direction and the plurality of content information pieces lined up in the one direction are separated from each other by one or more diagonal lines to the one direction.

REFERENCE SIGNS LIST 10 page
20 content information piece
30 diagonal line
40 area
100 information processing device
151 content information acquisition unit
153 page generation unit

The invention claimed is:

1. An information processing device, comprising:
circuitry configured to:
acquire a plurality of content information pieces;
generate a page in which the plurality of content information pieces are positioned based on templates associated with configurations of information elements, wherein the plurality of content information pieces are lined up in a first direction in the generated page, and the plurality of content information pieces are separated by a plurality of diagonal lines that are diagonal to the first direction;
determine, in the generated page, a portion of a first content information piece of the plurality of content information pieces that overlaps a second content information piece of the plurality of content information pieces, wherein the first content information piece is adjacent to the second content information piece in the first direction, and the first content information piece and the second content information piece are separated by at least two diagonal lines;
trim the portion of the first content information piece that overlaps the second content information piece along one of the at least two diagonal lines;
control a display screen to display the generated page based on the trimmed portion; and
change a relative positional relation between the at least two diagonal lines based on a scroll of the display screen.

2. The information processing device according to claim 1, wherein the at least two diagonal lines have different inclinations.

3. The information processing device according to claim 2, wherein the at least two diagonal lines include a first diagonal line inclined in a first rotation direction with respect to the first direction, and a second diagonal line inclined in a second rotation direction opposite to the first rotation direction.

4. The information processing device according to claim 3, wherein the circuitry is further configured to generate the page in which the first content information piece is separated from the second content information piece by the first diagonal line inclined in the first rotation direction, and the first content information piece is separated from a third content information piece of the plurality of content information pieces by a third diagonal line inclined in the second rotation direction.

5. The information processing device according to claim 3, wherein the circuitry is further configured to generate the page in which the first content information piece is between the first diagonal line and a third diagonal line of the plurality of diagonal lines, wherein the third diagonal line is inclined in the first rotation direction, and the second content information piece is between the second diagonal line and a fourth diagonal line of the plurality of diagonal lines, and wherein the fourth diagonal line is inclined in the second rotation direction.

6. The information processing device according to claim 5, wherein the circuitry is further configured to determine a distance between the first diagonal line and the third diagonal line based on at least one of the first content information piece or the second content information piece.

7. The information processing device according to claim 2,
wherein the circuitry is further configured to generate the page in which the first content information piece is separated from the second content information piece by the at least two diagonal lines, and
wherein the at least two diagonal lines are inclined at different inclinations in an identical rotation direction with respect to the first direction.

8. The information processing device according to claim 7, wherein the circuitry is further configured to determine a difference between the inclinations of the at least two diagonal lines based on at least one of the first content information piece and the second content information piece.

9. The information processing device according to claim 2,
wherein the circuitry is further configured to:
generate the page in which the first content information piece is separated from the second content information piece by the at least two diagonal lines with different inclinations.

10. The information processing device according to claim 1, wherein the circuitry is further configured to determine an inclination of each diagonal line of the plurality of diagonal lines based on at least one content information piece of the plurality of content information pieces that is separated by a corresponding diagonal line of the plurality of diagonal lines.

11. The information processing device according to claim 10, wherein the circuitry is further configured to determine the inclination of each diagonal line of the plurality of diagonal lines based on an amount of at least one of two content information pieces of the plurality of content information pieces separated by the corresponding diagonal line of the plurality of diagonal lines.

12. The information processing device according to claim 10, wherein the circuitry is further configured to determine the inclination of each diagonal line of the plurality of diagonal lines based on an amount of information, provided by an information service, corresponding to at least one of two content information pieces of the plurality of content information pieces separated by the corresponding diagonal line of the plurality of diagonal lines.

13. The information processing device according to claim 1, wherein a first area of the page is separated by the at least two diagonal lines from a second area of the page, wherein the first area has at least one of a first color or a first pattern different from a second color or a second pattern of the second area.

14. The information processing device according to claim 13, wherein, among the plurality of content information pieces lined up in the first direction, areas of one of even-numbered or odd-numbered content information pieces have at least one of an identical color or an identical pattern.

15. The information processing device according to claim 13,
wherein the plurality of diagonal lines includes a first diagonal line and a second diagonal line adjacent to the first diagonal line in the first direction, a third diagonal line adjacent to the first diagonal line in the first direction, and a fourth diagonal line adjacent to the second diagonal line in the first direction,
wherein the page includes the first area separated by the first diagonal line and the second diagonal line, the second area separated by the first diagonal line and the third diagonal line, and a third area separated by the second diagonal line and the fourth diagonal line, and
wherein the first area includes the first content information piece, and the first color of the first area is based on the second color of the second area and a third color of the third area.

16. The information processing device according to claim 1, wherein each of the plurality of diagonal lines is a boundary between two areas having at least one of different colors or different patterns.

17. The information processing device according to claim 1, wherein the circuitry is further configured to acquire the plurality of content information pieces from a plurality of information services.

18. The information processing device according to claim 1, wherein at least one of the plurality of content information pieces includes at least one of textual information or image information as the information elements.

19. An information processing method, comprising:
in an information processing device:
acquiring a plurality of content information pieces;
generating a page in which the plurality of content information pieces are positioned based on templates associated with configurations of information elements, wherein the plurality of content information pieces are lined up in a first direction in the generated page, and the plurality of content information pieces are separated by a plurality of diagonal lines that are diagonal to the first direction;
determining, in the generated page, a portion of a first content information piece of the plurality of content information pieces that overlaps a second content information piece of the plurality of content information pieces, wherein the first content information piece is adjacent to the second content information piece in the first direction, and the first content information piece and the second content information piece are separated by at least two diagonal lines;
trimming the portion of the first content information piece that overlaps the second content information piece along one of the at least two diagonal lines;
controlling a display screen to display the generated page based on the trimmed portion; and
changing a relative positional relation between the at least two diagonal lines based on a scroll of the display screen.

20. A non-transitory computer readable medium having stored thereon, computer-executable instructions, which when executed by a processor of an information processing device, cause the processor to execute operations, the operations comprising:
acquiring a plurality of content information pieces;
generating a page in which the plurality of content information pieces are positioned based on templates associated with configurations of information elements, wherein the plurality of content information pieces are lined up in a first direction in the generated page, and the plurality of content information pieces are separated by a plurality of diagonal lines that are diagonal to the first direction;
determining, in the generated page, a portion of a first content information piece of the plurality of content information pieces that overlaps a second content information piece of the plurality of content information pieces, wherein the first content information piece is adjacent to the second content information piece in the first direction, and the first content information piece and the second content information piece are separated by at least two diagonal lines;
trimming the portion of the first content information piece along one of the at least two diagonal lines;
controlling a display screen to display the generated page based on the trimmed portion; and
changing a relative positional relation between the at least two diagonal lines based on a scroll of the display screen.

* * * * *